US008756311B2

(12) United States Patent
Dare et al.

(10) Patent No.: US 8,756,311 B2
(45) Date of Patent: Jun. 17, 2014

(54) SHARED HEARTBEAT SERVICE FOR MANAGED DEVICES

(75) Inventors: Robert M. Dare, Sunrise, FL (US); John R. Brown, Boynton Beach, FL (US); Paul Krzyzanowski, Flemington, NJ (US); Michael Kelly, Deerfield Beach, FL (US)

(73) Assignee: OpenPeak Inc., Boca Raton, FL (US)

( * ) Notice: Subject to any disclaimer, the term of this patent is extended or adjusted under 35 U.S.C. 154(b) by 166 days.

(21) Appl. No.: 13/116,834

(22) Filed: May 26, 2011

(65) Prior Publication Data

US 2011/0296011 A1 Dec. 1, 2011

Related U.S. Application Data

(60) Provisional application No. 61/349,718, filed on May 28, 2010.

(51) Int. Cl.
*G06F 15/173* (2006.01)
(52) U.S. Cl.
USPC ........................................ 709/224; 709/203
(58) Field of Classification Search
USPC ............................................ 709/1, 202, 224
See application file for complete search history.

(56) References Cited

U.S. PATENT DOCUMENTS

| 7,120,688 | B1 * | 10/2006 | Nguyen et al. ................ 709/224 |
| 7,620,001 | B2 | 11/2009 | Ganji |
| 2003/0130984 | A1 * | 7/2003 | Quinlan et al. .................... 707/1 |
| 2004/0098449 | A1 * | 5/2004 | Bar-Lavi et al. .............. 709/202 |
| 2006/0075077 | A1 | 4/2006 | Brookner |
| 2007/0156870 | A1 | 7/2007 | McCollum |
| 2007/0294380 | A1 | 12/2007 | Natarajan et al. |
| 2008/0098160 | A1 | 4/2008 | Slyz et al. |
| 2009/0288079 | A1 * | 11/2009 | Zuber et al. .................... 717/176 |
| 2010/0077035 | A1 * | 3/2010 | Li et al. .......................... 709/206 |
| 2010/0281474 | A1 | 11/2010 | Eason et al. |
| 2011/0099233 | A1 * | 4/2011 | Calder et al. .................. 709/206 |

FOREIGN PATENT DOCUMENTS

WO 2011/150234 A1 12/2011

OTHER PUBLICATIONS

International Search Report and Written Opinion received for PCT Application No. PCT/US2011/038184, mailed on Aug. 26, 2011, 13 pages.
International Search Report and Written Opinion for International Application No. PCT/US2011/068038, mailed on Aug. 31, 2012, 9 pages.

* cited by examiner

*Primary Examiner* — Un C Cho
*Assistant Examiner* — M Mostazir Rahman

(57) ABSTRACT

Systems, methods, and apparatuses for facilitating communication between remote services and applications installed on a device are described. In accordance with embodiments, each of a plurality of remote services generates an application-specific message intended for processing by a corresponding application installed on a device and transmits the application-specific message to a device management system (DMS) server, where it is queued. A DMS client installed on the device sends heartbeat messages to the DMS server indicating that the device is available to receive messages. In response to receiving the heartbeat messages, the DMS server transmits the application-specific messages to the DMS client. The DMS client then publishes each application-specific message to the particular application that the application-specific message was intended for.

20 Claims, 9 Drawing Sheets ns and methods for facilitating communication between automated entities—omitting—

SHARED HEARTBEAT SERVICE FOR MANAGED DEVICES

CROSS-REFERENCE TO RELATED APPLICATIONS

This application claims priority to U.S. Provisional Patent Application No. 61/349,718, filed May 28, 2010 and entitled "Device Management Services," the entirety of which is incorporated by reference herein.

BACKGROUND OF THE INVENTION

1. Field of the Invention

The present invention generally relates to systems and methods for facilitating communication between automated entities, such as between remote services and applications associated therewith that are installed on devices.

2. Background

Numerous software applications have been developed for use on networked devices. Many of these applications rely on communication with a remote service, such as a Web service, to support at least some of the application functionalities or features. For example, a remote service may communicate with an application to notify the application or a user thereof that an event that has occurred, to deliver content to the user of the application, to update the application, or the like.

Facilitating such communication is difficult when the application is installed on a device that is deployed in a different network or subnet. It is often not possible to directly address devices in other networks across the Internet because the remote network is often protected by constraints like Firewalls and Network Address Translation (NAT). Thus, a remote service residing on a publicly accessible server may not be able to initiate communication with the device or application. To deal with this issue, some applications have been developed that perform periodic polling when the device upon which they are installed is active, thereby indicating availability for communication with a remote service. Such periodic polling may be referred to as providing a "heartbeat" and the individual polling messages may be referred to as "heartbeat messages."

Providing a heartbeat for an application consumes processing resources of the device upon which the application is installed, processing resources of the network nodes used to relay and/or process the heartbeat messages, and bandwidth on the network links over which the heartbeat messages are relayed. As more and more applications that provide a heartbeat are installed on a device, the consumption of those resources will increase. This can lead to reduced performance by the device as well as reduced performance by the network to which the device is connected.

Furthermore, some devices may not be capable of communicating via the Internet at all. Consequently, such devices cannot support applications that rely on communication with a remote service to support at least some application functionality or features.

BRIEF SUMMARY OF THE INVENTION

Systems, methods, and apparatuses are described herein for facilitating communication between remote services and applications installed on a device. In accordance with certain embodiments, each of a plurality of remote services generates an application-specific message intended for processing by a corresponding application installed on a device and transmits the application-specific message to a device management system (DMS) server, where it is queued. A DMS client installed on the device sends heartbeat messages to the DMS server indicating that the device is available to receive messages. In response to receiving the heartbeat messages, the DMS server transmits the application-specific messages to the DMS client. The DMS client then publishes each application-specific message to the particular application that the application-specific message was intended for.

By utilizing only a single, shared heartbeat to facilitate communication between multiple remote services and multiple corresponding applications installed on a device as described above, embodiments described herein can provide reduced resource consumption and improved performance as compared to an implementation in which each application installed on the device provides its own heartbeat.

In particular, a method for facilitating communication between remote services and applications installed on a device is described herein. In accordance with the method, heartbeat messages sent from a DMS client executing on the device are received by a DMS server, the heartbeat messages indicating that the DMS client is available to receive messages. In response to receiving the heartbeat messages, the DMS server transmits a plurality of application-specific messages to the DMS client, each application-specific message being generated by a corresponding remote service for processing by a corresponding application installed on the device. The method may further include receiving the application-specific messages from the corresponding remote services at the DMS server via a message publication application programming interface (API) and storing the application-specific messages in a queue at the DMS server prior to transmission to the DMS client.

A further method for facilitating communication between remote services and applications installed on a device is described herein. In accordance with the further method, heartbeat messages are sent from a DMS client executing on the device to a DMS server, the heartbeat messages indicating that the DMS client is available to receive messages. The DMS client then receives a plurality of application-specific messages that were transmitted by the DMS server in response to receiving the heartbeat messages, each application-specific message being generated by a corresponding remote service for processing by a corresponding application installed on the device. The method may further include publishing the application-specific messages by the DMS client to corresponding applications installed on the device via a message subscriber API.

A DMS server is also described herein. The DMS server includes a message publisher interface and DMS server logic. The message publisher interface receives a plurality of application-specific messages, each of the application-specific messages being generated by a corresponding remote service for processing by a corresponding application installed on a device. The DMS server logic receives heartbeat messages sent from a DMS client executing on the device and transmits the plurality of application-specific messages to the DMS client in response to the receipt of the heartbeat messages. The DMS server may further include a queue and the DMS server logic may store the plurality of application-specific messages in the queue prior to transmission to the DMS client.

A device is also described herein. The device includes a DMS client and a message subscriber interface. The DMS client sends heartbeat messages to a DMS server, the heartbeat messages indicating that the DMS client is available to receive messages. The DMS client also receives a plurality of application-specific messages that were transmitted by the DMS server in response to receiving the heartbeat messages, each application-specific message being generated by a corresponding remote service for processing by a corresponding application installed on the device. The message subscriber interface is used by the DMS client to publish the application-specific messages to the corresponding applications installed on the device. The DMS client may also register the corresponding applications as subscribers to which application-specific messages may be published in response to receiving subscription requests from the corresponding applications via the message subscriber interface.

Systems, methods and apparatuses are also described herein for enabling devices that are incapable of communicating via the Internet to run applications that rely on communication with a remote service to support certain application functionalities or features. In accordance with certain embodiments, a DMS client device acts as an intermediary between applications installed on a device that is incapable of communicating via the Internet and one or more remote services. In particular, the DMS client device includes a DMS client that sends heartbeat messages to a DMS server, the heartbeat messages indicating that the DMS client is available to receive messages. The DMS client also receives at least one application-specific message that was transmitted by the DMS server in response to receiving the heartbeat messages, the at least one application-specific message being generated by a corresponding remote service for processing by a corresponding application installed on a device that is connected to the DMS client device (e.g., a device that is incapable of communicating via the Internet). The DMS client device further includes a device messaging adapter that transmits the at least one application-specific message from the DMS client device to the device connected thereto.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
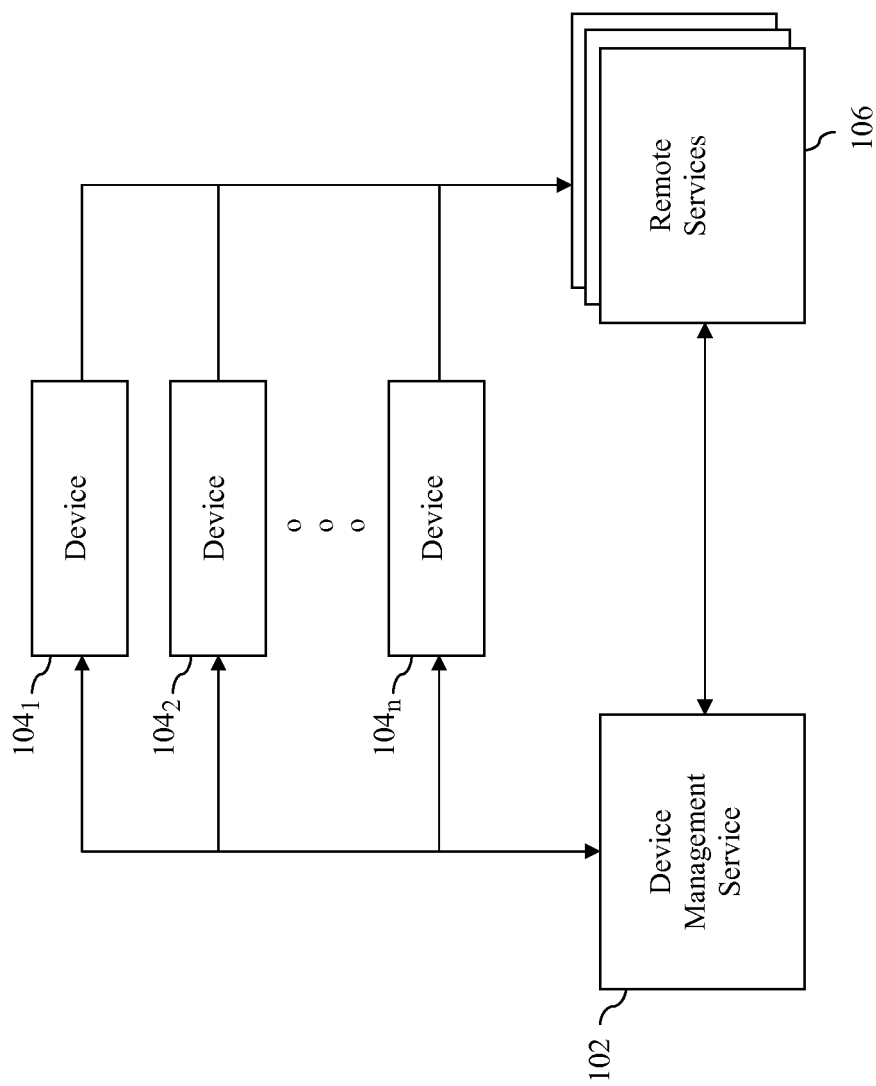
FIG. 1 is a block diagram of an system that utilizes a shared heartbeat service for facilitating communication between remote services and applications associated therewith that are installed on devices in accordance with an embodiment of the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example System that Utilizes a Shared Heartbeat Service for Managed Devices

FIG. 1 is a block diagram of an example system 100 that utilizes a shared heartbeat service for facilitating communication between remote services and applications associated therewith that are installed on devices in accordance with an embodiment of the present invention. As shown in FIG. 1, system 100 includes a plurality of deployed devices $104_1$-$104_n$, each of which is communicatively connected to a remotely-located device management service 102. Device management service 102 comprises an automated system that is configured to perform remote management functions with respect to each of devices $104_1$-$104_n$. Such management functions may include, for example and without limitation, communicating updated firmware, software and/or device configuration information to one or more of devices $104_1$-$104_n$. However, these are only examples, and device management service 102 may perform a variety of other remote management functions with respect to each of devices $104_1$-$104_n$.

As further shown in FIG. 1, each of devices $104_1$-$104_n$ is also communicatively connected to a plurality of remote services 106. Each remote service 106 comprises an automated system that operates to provide one or more services to or perform one or more operations on behalf of remotely-executing applications. A remote service 106 may comprise, for example, a Web service or any other type of service that is invoked via machine-to-machine interaction such as a remote procedure call (RPC) or interaction supported by CORBA (Common Object Request Broker Architecture). In system 100, each of devices $104_1$-$104_n$ is capable of executing at least one application that relies on communication with a corresponding one of remote services 106 to support at least some application functionalities or features. For example, an application executing on any of devices $104_1$-$104_n$ may include a functionality or feature that is supported by the receipt of one or more messages from one of remote services 106.

Remote services 106 are also communicatively connected to device management service 102 and are capable of sending messages thereto. Communication among devices $104_1$-$104_n$, device management service 102, and remote services 106 may be carried out over a network or combination of networks. Such network(s) may include, for example, the Internet. However, this example is not intended to be limiting, and communication among devices $104_1$-$104_n$, device management service 102, and remote services 106 may be carried out over any type of network or combination of networks including one or more wide area networks (WANs), local area networks (LANs), private networks, public networks, packet networks, circuit-switched networks, and wired or wireless networks.

Depending upon the implementation, each of deployed devices $104_1$-$104_n$ may comprise, for example and without limitation, a personal computer, a laptop computer, a tablet computer, a telephone, a personal digital assistant, a personal media player, or the like. Each device $104_1$-$104_n$ may also comprise a device that is embedded in another device. Furthermore, each device $104_1$-$104_n$ may comprise a device that operates to provide connectivity between other devices, such as a router, switch, or the like.

Figure 2:
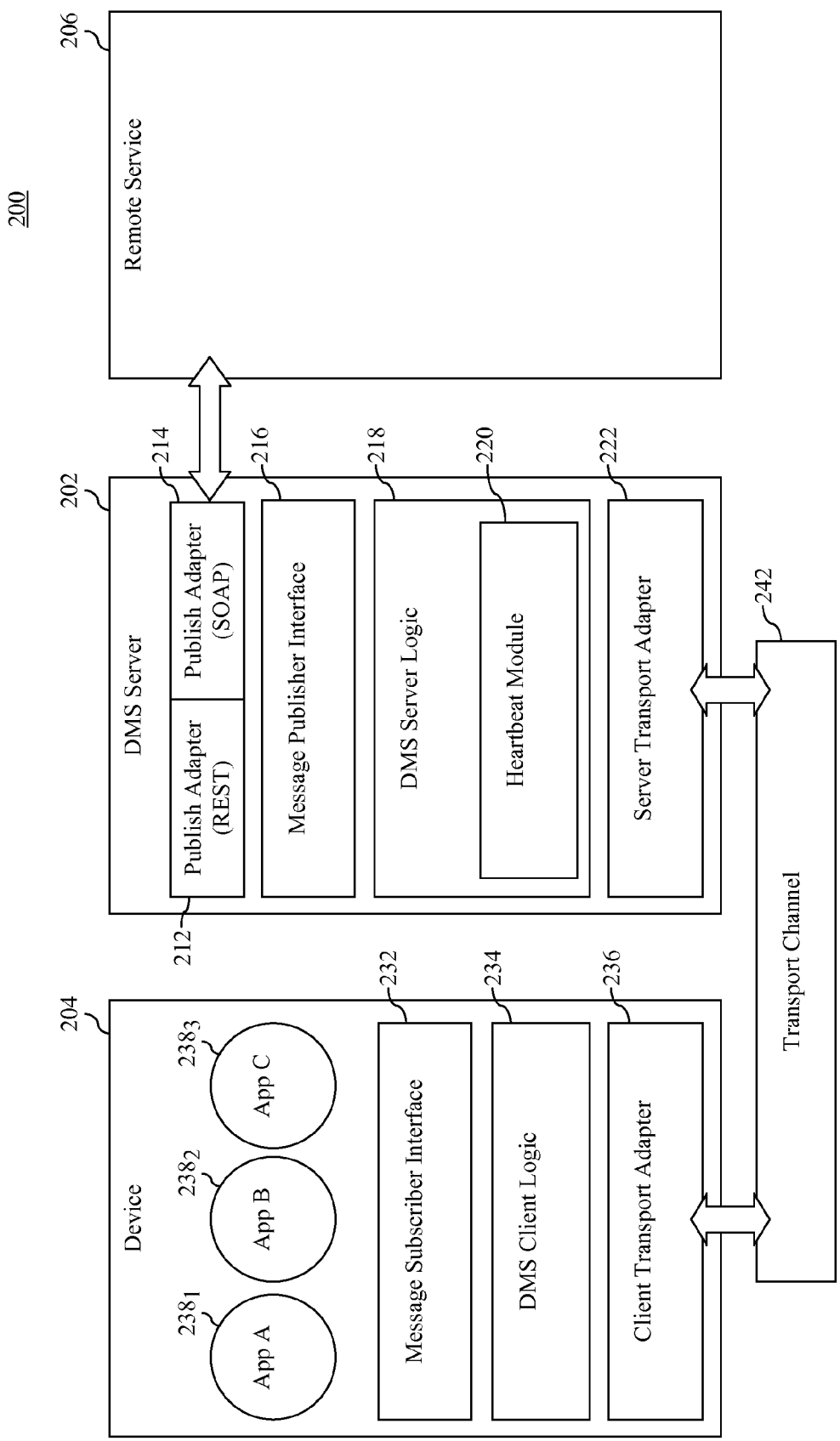
FIG. 2 is a block diagram that illustrates additional details concerning various components of the system of FIG. 1.

FIG. 2 is a block diagram 200 that provides additional details concerning various components of system 100 as described above in reference to FIG. 1. In particular, block diagram 200 includes a device 204, which is intended to represent one of devices $104_1$-$104_n$, a device management service (DMS) server 202, which is intended to represent a component of device management service 102, and a remote service 206, which is intended to represent one of remote services 106.

As shown in FIG. 2, DMS server 202 includes DMS server logic 218 while device 204 includes DMS client logic 234. DMS server logic 218 is configured to execute remote management functions with respect to device 204 by interacting with DMS client logic 234 via a transport channel 242. As noted above, the performance of such remote management functions may include, for example and without limitation, communicating updated firmware, software and/or device configuration information from DMS server logic 218 to DMS client logic 234.

Device 204 may be deployed in a different network or subnet than DMS server 202. Consequently, DMS server 202 may not be able to directly address device 204 because the network in which device 204 is deployed may be protected by constraints like Firewalls and Network Address Translation (NAT). To deal at least in part with this issue, DMS server logic 218 and DMS client logic 234 jointly implement a heartbeat service. In accordance with such a heartbeat service, when device 204 is available for communication, DMS client logic 234 periodically sends polling messages, or "heartbeat messages," to DMS server logic 218 via transport channel 242 to notify DMS server logic 218 of such availability. In response to receiving such heartbeat messages from DMS client logic 234, DMS server logic 202 may then send one or more device-management related messages to DMS client logic 234 via transport channel 242, wherein each message may include one or more device-management related commands to be carried out by DMS client logic 234. Such commands may include, for example and without limitation, commands to install or update software on device 204, commands to install or update firmware on device 204, and/or commands to alter a configuration of device 204.

As shown in FIG. 2, device 204 further includes a plurality of software applications installed for execution thereon. In particular, a first application $238_1$ (also denoted "App A"), a second application $238_2$ (also denoted "App B"), and a third application $238_3$ (also denoted "App C") are installed on device 204 and may be executed thereon. Each of these applications may rely on communication with a remote service, such as remote service 206, to support at least some application functionalities or features. However, since device 204 may be deployed in a different network or subnet that is protected by a Firewall or NAT as noted above, device 204 may not be directly addressable by such remote services.

Figure 3:
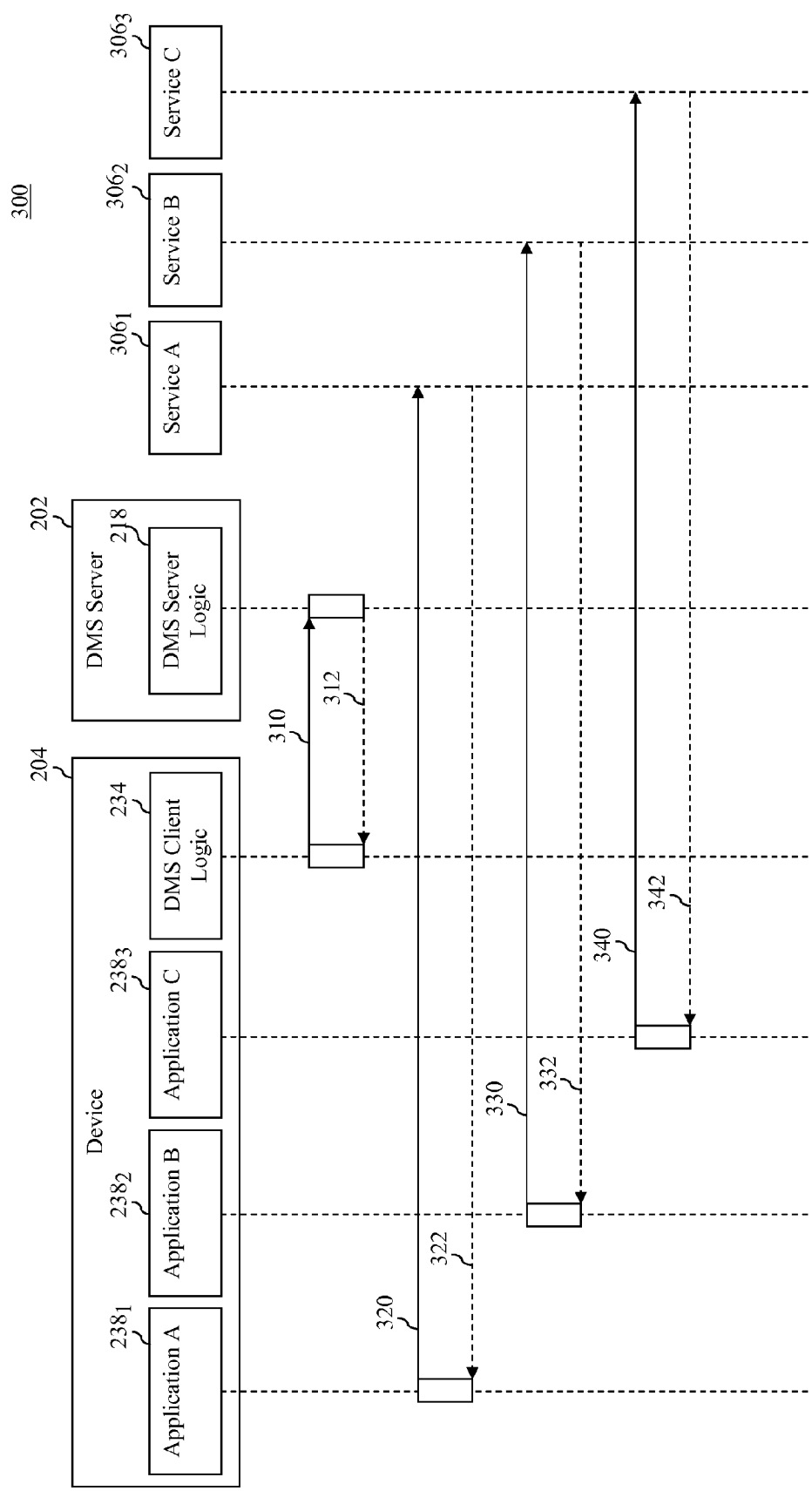
FIG. 3 depicts a sequence diagram that illustrates an implementation in which each application installed on a device provides its own heartbeat to a corresponding remote service.

One approach to dealing with this issue would be to configure each of applications $238_1$-$238_3$ to send its own heartbeat messages to a corresponding remote service when device 204 is available for communication. FIG. 3 depicts a sequence diagram 300 that shows how such an approach might be implemented. As shown in FIG. 3, DMS client logic 234 within device 204 sends a heartbeat message 310 to DMS server logic 218 within DMS server 202 to indicate that device 204 is available for communication. In response to receiving heartbeat message 310, DMS server logic 218 sends one or more device-management related messages 312 to DMS client logic 234. Following this sequence of events, first application $238_1$ (also denoted "Application A") sends its own heartbeat message 320 to a first remote service $306_1$ (also denoted "Service A") and, in response to receiving heartbeat message 320, first remote service $306_1$ sends one or more application-specific messages 322 to first application $238_1$. In a like manner, second application $238_2$ (also denoted "Application B") sends its own heartbeat message 330 to a second remote service $306_2$ (also denoted "Service B") and receives one or more application-specific messages 332 from second remote service $306_2$ in response while third application $238_3$ (also denoted "Application C") sends its own heartbeat message 340 to a third remote service $306_3$ (also denoted "Service C") and receives one or more application-specific messages 342 from third remote service $306_3$ in response.

Providing a separate heartbeat for DMS client logic 234 and each of applications $238_1$-$238_3$ in the manner shown in FIG. 3 consumes processing resources of device 204, processing resources of the network nodes used to relay and/or process the heartbeat messages, and bandwidth on the network links over which the heartbeat messages are relayed. As more and more applications that provide a heartbeat are installed on device 204, the consumption of those resources will increase. This can lead to reduced performance by device 204 as well as reduced performance by the network to which device 204 is connected.

In contrast to the approach depicted in FIG. 3, an embodiment of the present invention enables each of applications $238_1$-$238_3$ to "share" the heartbeat provided by DMS client logic 234 to facilitate communication between those applications and corresponding remote services $306_1$-$306_3$. To achieve this, DMS server 202 includes a message publisher interface 216 that enables remote services $306_1$-$306_3$ to publish messages in an asynchronous manner for queuing and subsequent delivery to corresponding applications $238_1$-$238_3$ installed on device 204. Additionally, device 204 includes a message subscriber interface 232 that enables applications $238_1$-$238_3$ to subscribe to receive messages published by remote services $306_1$-$306_3$ and queued by DMS server 202. When DMS server logic 218 on DMS server 202 receives a heartbeat message from DMS client logic 234, DMS server logic 218 can transmit any pending application-specific messages from remote services $306_1$-$306_3$ to DMS client logic 234. DMS client logic 234 can then deliver each of the application-specific messages to the appropriate application $238_1$-$238_3$ via message subscriber interface 232.

By allowing each application $238_1$-$238_3$ to thus leverage the heartbeat provided by DMS client logic 234 to receive messages from corresponding remote services $306_1$-$306_3$, an embodiment of the present invention can achieve reduced resource consumption and improved performance as compared to an implementation in which each application provides its own heartbeat, such as the one described above in reference to sequence diagram 300 of FIG. 3.

Figure 4:
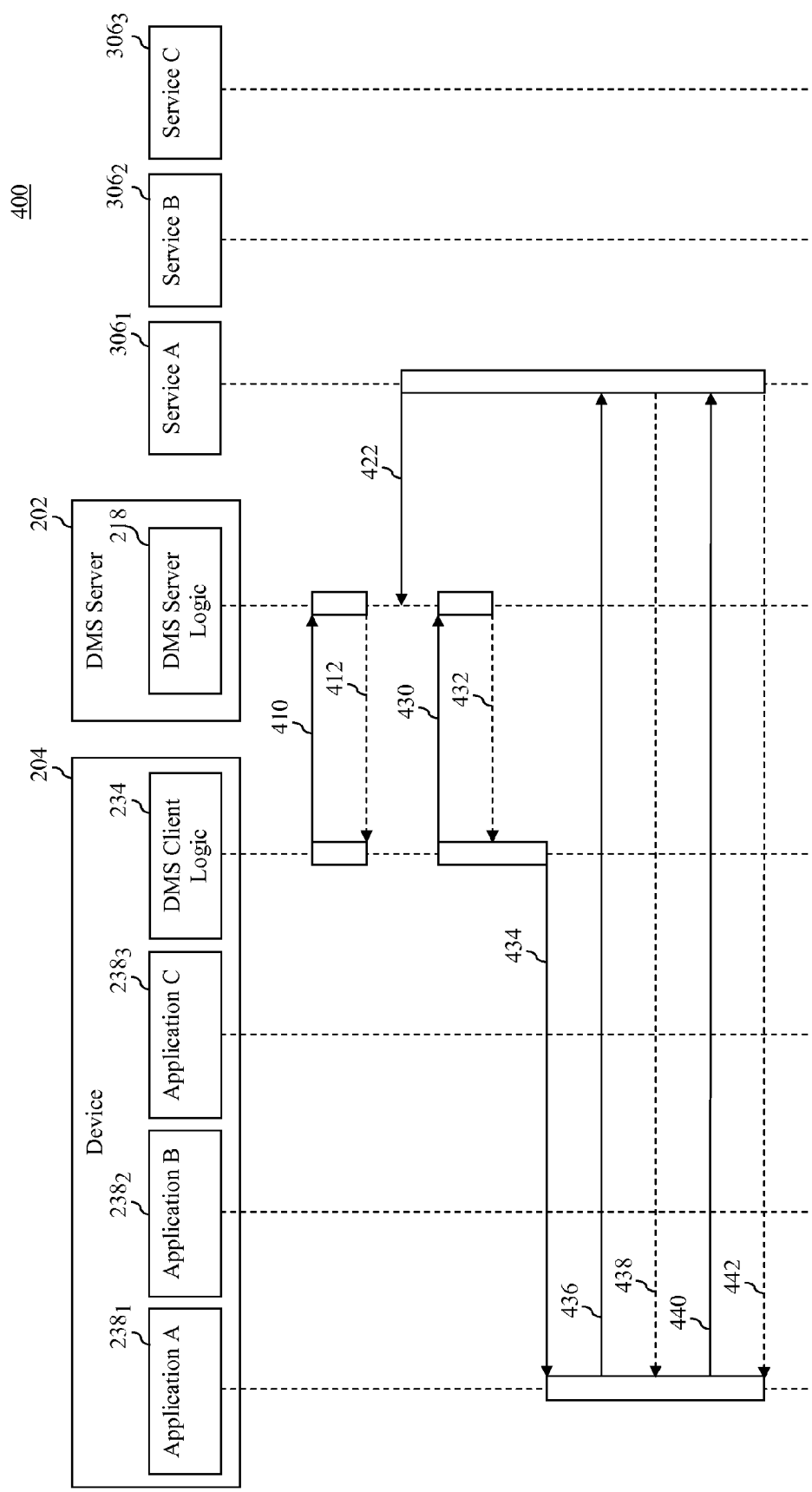
FIG. 4 depicts a sequence diagram that illustrates how applications installed on a device can share a heartbeat provided by device management service (DMS) client logic to receive messages from a corresponding remote service in accordance with an embodiment of the invention.

FIG. 4 depicts an example sequence diagram 400 that illustrates the manner in which an application installed on device 204 can share the heartbeat provided by DMS client logic 234 to receive messages from a corresponding remote service. In accordance with the example shown in FIG. 4, it is to be assumed that first application $238_1$ has subscribed via message subscriber interface 232 to receive messages from first remote service $306_1$.

As shown in FIG. 4, DMS client logic 234 within device 204 sends a heartbeat message 410 to DMS server logic 218 within DMS server 202 to indicate that device 204 is available for communication. In response to receiving heartbeat message 410, DMS server logic 218 sends one or more device-management related messages 412 to DMS client logic 234. It is to be assumed that no application-specific messages are pending for delivery to DMS client logic 234 at this time.

Following this sequence of events, first remote service $306_1$ asynchronously publishes an application-specific message 422 for delivery to at least first application $238_1$ via message publisher interface 216 of DMS server 202. This application-specific message is received and queued for delivery at DMS server 202. After the application-specific message has been thus received and queued for delivery at DMS server 202, DMS client logic 234 sends another heartbeat message 430 to DMS server logic 218. In response to receiving heartbeat message 430, DMS server logic 218 sends one or more device-management related messages and the pending application-specific message, collectively represented as messages 432, to DMS client logic 234. DMS client logic 234 then publishes the application-specific message 434 to first application $238_1$ via message subscriber interface 232.

First application $238_1$ may then process the application-specific message. Depending on the content of the application-specific message, this may cause first application $238_1$ to perform a particular action or perhaps take no action at all. In the example, shown in FIG. 4, in response to the processing of the application-specific message first application $238_1$, first application $238_1$ "phones home" to first remote service $306_1$ as represented by message 436. This may entail, for example, establishing a link to a predefined Uniform Resource Location (URL) or to a URL specified in the application-specific message. After such link has been established, further communication between first application $238_1$ and first remote service $306_1$ may occur, as represented by messages 438, 440 and 442. As noted above, however, this is only an example, and first application $238_1$ may be caused to perform other action in response to processing the application-specific message.

Additional details regarding the example implementation depicted in FIG. 2 will now be provided. As previously described, DMS server 202 includes message publisher interface 216 and DMS server logic 218. In at least one embodiment, message publisher interface 216 comprises a well-defined remote services application programming interface (API) that may be invoked using any of a variety of remote services protocols. As further shown in FIG. 2, DMS server 202 includes a first publish adapter 212 that enables remote services to interact with message publisher interface 216 using the well-known REST (Representational State Transfer) protocol and a second publish adapter 214 that enables remote services to interact with message publisher interface 216 using the well-known SOAP (Simple Object Access Protocol) protocol. Still other protocols may be used to interact with message publisher interface 216 and DMS server 202 may include additional adapters to accommodate such protocols.

DMS server logic 218 is shown as including a heartbeat module 220. Heartbeat module 220 is intended to represent that portion of DMS server logic 218 that performs functions necessary to implement a shared heartbeat service for managed devices as described herein. As noted above, DMS server logic 218 may also perform any number of remote management functions with respect to device 204 and other devices whether or not such remote management functions are explicitly described herein.

As was also previously described, device 204 includes applications $238_1$-$238_3$, message subscriber interface 232 and DMS client logic 234. In at least one embodiment, message subscriber interface 232 comprises a well-defined API that may be called by any of applications $238_1$-$238_3$. A description of such an API may be included in publicly-accessible software developers kit (SDK) so that application developers can develop applications that can utilize the shared heartbeat service.

As further shown in FIG. 2, DMS server 202 includes a server transport adapter 222 and client transport adapter 236. These transport adapters enable DMS server 202 and device 204, respectively, to engage in communication over transport channel 242 established there between. As will be appreciated by persons skilled in the relevant art(s), the manner in which server transport adapter 222 and client transport adapter 236 are implemented will depend upon the particular communication protocol used to communicate over transport channel 242. A variety of different communication protocols may be used depending upon the deployment requirements. By way of example only and without limitation, application layer protocols such as HTTP (Hypertext Transfer Protocol)/HTTPS (Hypertext Transfer Protocol Secure), XMPP (Extensible Messaging and Presence Protocol) and SIP (Session Initiation Protocol) may be used for communication. Also, transport layer protocols such as TCP (Transmission Control Protocol) or UDP (User Datagram Protocol) may be used for communication. In accordance with at least one embodiment, the particular type of transport adapter to be used to for communication between device 204 and DMS server 202 may be changed at runtime to dynamically accommodate a variety of different communication protocols.

A variety of security models may also be used to provide secure communications over transport channel 242. Such security models can provide features relating to, for example, privacy, authentication and validation. With respect to privacy, mechanisms such as HTTPS and public/private key encryption may be used to ensure that a message can only be read by an intended recipient. With respect to authentication, mechanisms such as self-signed certificates and certificates issued from a trusted authority may be used to provide verification of the identity of a sender of a message and/or a recipient thereof. With respect to message validation, mechanisms such as public/private key hashes and MD5 checksums may be used to verify that a message has not been altered in transit. Still other security models and mechanisms may be used.

As discussed above, DMS client logic 234 sends heartbeat messages to DMS server logic 218. These messages may introduce a network and processing load at DMS server 202. In accordance with at least one embodiment, DMS server logic 218 is configured to send a message to DMS client logic 234 to readjust a heartbeat interval in order to manage a load on DMS server 202. For example by causing DMS client logic 234 to switch from a 15 second heartbeat interval to a 30 second heartbeat interval, an embodiment can effectively halve the workload on DMS sever 202. In one embodiment, the heartbeat interval is managed by sending DMS client logic 234 a message informing DMS client logic 234 of the new heartbeat interval. In accordance with such an embodiment, DMS server 202 can dynamically control its load. For example, when a network traffic or processing load (e.g., queue of requests) of DMS server 202 exceeds a certain threshold, DMS server logic 218 can send a message to one or more managed devices to readjust the heartbeat interval. Also, when a managed device is connected via specific networks, such as cellular networks, it may have a policy that lowers its heartbeat interval to minimize the use of data on that network.

C. Example Shared Heartbeat Methods

Figure 5:
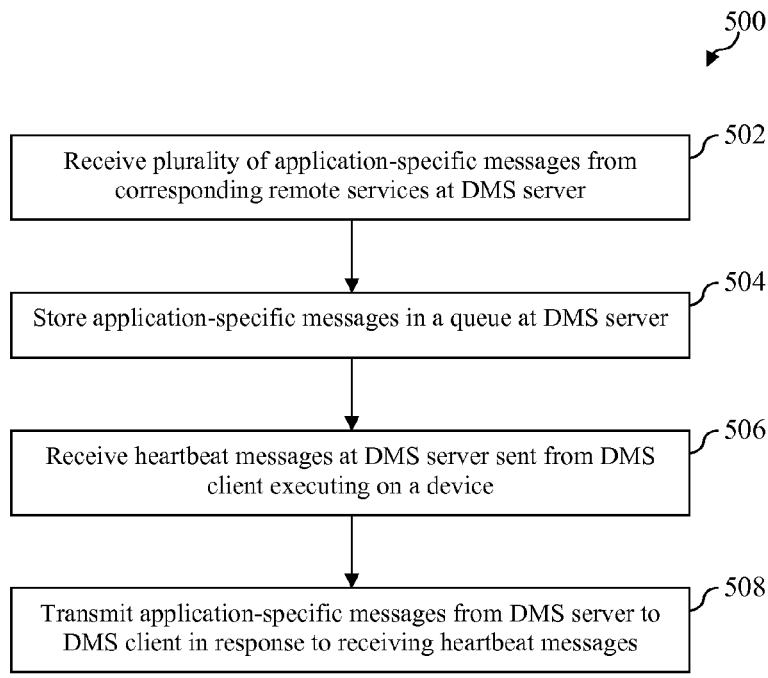
FIG. 5 depicts a flowchart of a shared heartbeat method for facilitating communication between remote services and applications installed on a device in accordance with an embodiment of the invention.

FIG. 5 depicts a flowchart 500 of a shared heartbeat method for facilitating communication between remote services and applications installed on a device in accordance with an embodiment of the present invention. The method of flowchart 500 will now be described with continued reference to the example system components described above in reference to FIGS. 1-4. However, the method is not limited to those implementations. Persons skilled in the relevant art(s) will appreciate that the steps of flowchart 500 may be implemented by other components or systems entirely.

As shown in FIG. 5, the method of flowchart 500 begins at step 502 in which a plurality of application-specific messages are received from a corresponding plurality of remote services at a DMS server. Each application-specific message is generated by a corresponding one of the remote services for processing by a corresponding application installed on a device. This step may be performed, for example, by DMS server 202, which receives application-specific messages from corresponding remote services $306_1$-$306_3$ that are intended for processing by corresponding applications $238_1$-$238_3$ installed on device 204. Such application-specific messages may be received via message publisher interface 216, which may be invoked by the various remote services using any of a variety of remote service protocols.

At step 504, the DMS server stores the application-specific messages received during step 502 in a queue located at the DMS server pending delivery to one or more devices. This step may be performed, for example, by DMS server logic 218 of DMS server 202. In accordance with certain implementations, DMS server logic 218 also monitors a time-to-live value associated with each of one or more application-specific messages stored in the queue and removes an application-specific message from the queue if the time-to-live value associated therewith has expired. This functionality enables remote services to send messages to the DMS server that will only be delivered to applications installed on a device if the device receives the message within a certain timeframe.

At step 506, the DMS server receives heartbeat messages from a DMS client executing on the device. The heartbeat messages indicate that the DMS client is available to receive messages. This step may be performed, for example, by heartbeat module 220 of DMS server 202, which receives heartbeat messages generated by DMS client logic 234 of device 204. As previously described, DMS server 202 utilizes server transport adapter 222 to receive such heartbeat messages from transport channel 242.

At step 508, the DMS server transmits the queued application-specific messages that are intended for processing by applications installed on the device to the DMS client in response to receiving the heartbeat messages during step 506. This step may be performed, for example, by heartbeat module 220 of DMS server 202. For example, heartbeat module 220 may utilize server transport adapter 222 to transmit such application-specific messages to DMS client logic 234 via transport channel 242. In accordance with one embodiment, this step entails transmitting, in association with each application-specific message, an identification of an application-specific channel to which the application-specific message is to be published upon receipt by the DMS client.

Figure 6:
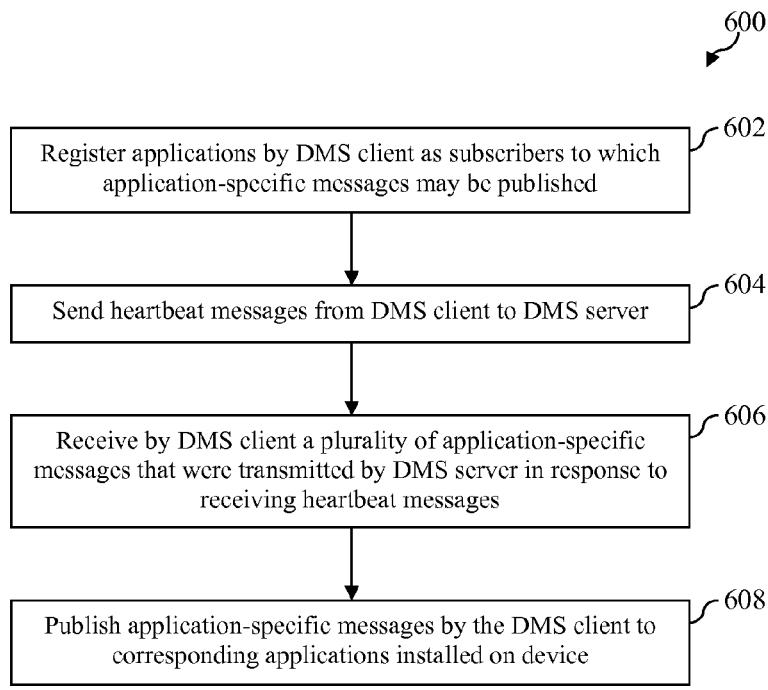
FIG. 6 depicts a flowchart of a further shared heartbeat method for facilitating communication between remote services and applications installed on a device in accordance with an embodiment of the present invention.

FIG. 6 depicts a flowchart 600 of a further shared heartbeat method for facilitating communication between remote services and applications installed on a device in accordance with an embodiment of the present invention. The method of flowchart 600 will now also be described with continued reference to the example system components described above in reference to FIGS. 1-4. However, the method is not limited to those implementations. Persons skilled in the relevant art(s) will appreciate that the steps of flowchart 600 may be implemented by other components or systems entirely.

As shown in FIG. 6, the method of flowchart 600 begins at step 602 in which a DMS client executing on a device registers a plurality of applications installed on the device as subscribers to which application-specific messages may be published. This step may be performed, for example, by DMS client logic 234 which registers applications $238_1$-$238_3$ as applications to which application-specific messages may be published responsive to receiving subscription requests from each of those applications via message subscriber interface 232.

At step 604, the DMS client sends heartbeat messages to a DMS server. The heartbeat messages indicate that the DMS client is available to receive messages. This step may be performed, for example, by DMS client logic 234 of device 204. As previously described, DMS client logic 234 utilizes client transport adapter 236 to send such heartbeat messages to DMS server 202 over transport channel 242.

At step 606, the DMS client receives a plurality of application-specific messages that were transmitted by the DMS server in response to receiving the heartbeat messages. Each application-specific message so received was generated by a corresponding remote service for processing by a corresponding application installed on the device. This step may be performed, for example, by DMS client logic 234 of device 204. As previously described, DMS client logic 234 utilizes client transport adapter 236 to receive such application-specific messages from transport channel 242.

At step 608, the DMS client publishes the application-specific messages received during step 606 to corresponding applications installed on the device for processing thereby. This step may be performed, for example, by DMS client logic 234 of device 204, which publishes each of the application-specific messages to a corresponding one of applications $238_1$-$238_3$ via message subscriber interface 232 for processing thereby. In accordance with one embodiment, this step comprises publishing each of the application-specific messages to a corresponding application-specific channel, wherein each application-specific channel corresponds to a particular application that subscribed to receive messages during step 602.

After each application receives its corresponding application-specific message, it then processes it. Depending on the content of a given application-specific message, this may cause an application to perform a particular action or perhaps take no action at all. As noted above, one example action that may be taken is establishing a link to a predefined URL or to a URL specified in the application-specific message, although this is only one example and any of a wide variety of actions that may be taken.

D. Inter-Application Communication

The shared heartbeat architecture described above in reference to FIGS. 1-4 may also be utilized to permit applications installed on the same device to communicate with each other. By way of example, a first application installed on device 204 may interact with message publisher interface 234 to subscribe to receive information about events occurring with respect to a second application installed on device 204. When such an event occurs, the first application can be notified by message publisher interface 234. The foregoing approach to inter-application communication is advantageous in that it provides a standard interface by which diverse applications can share information with each other.

Figure 7:
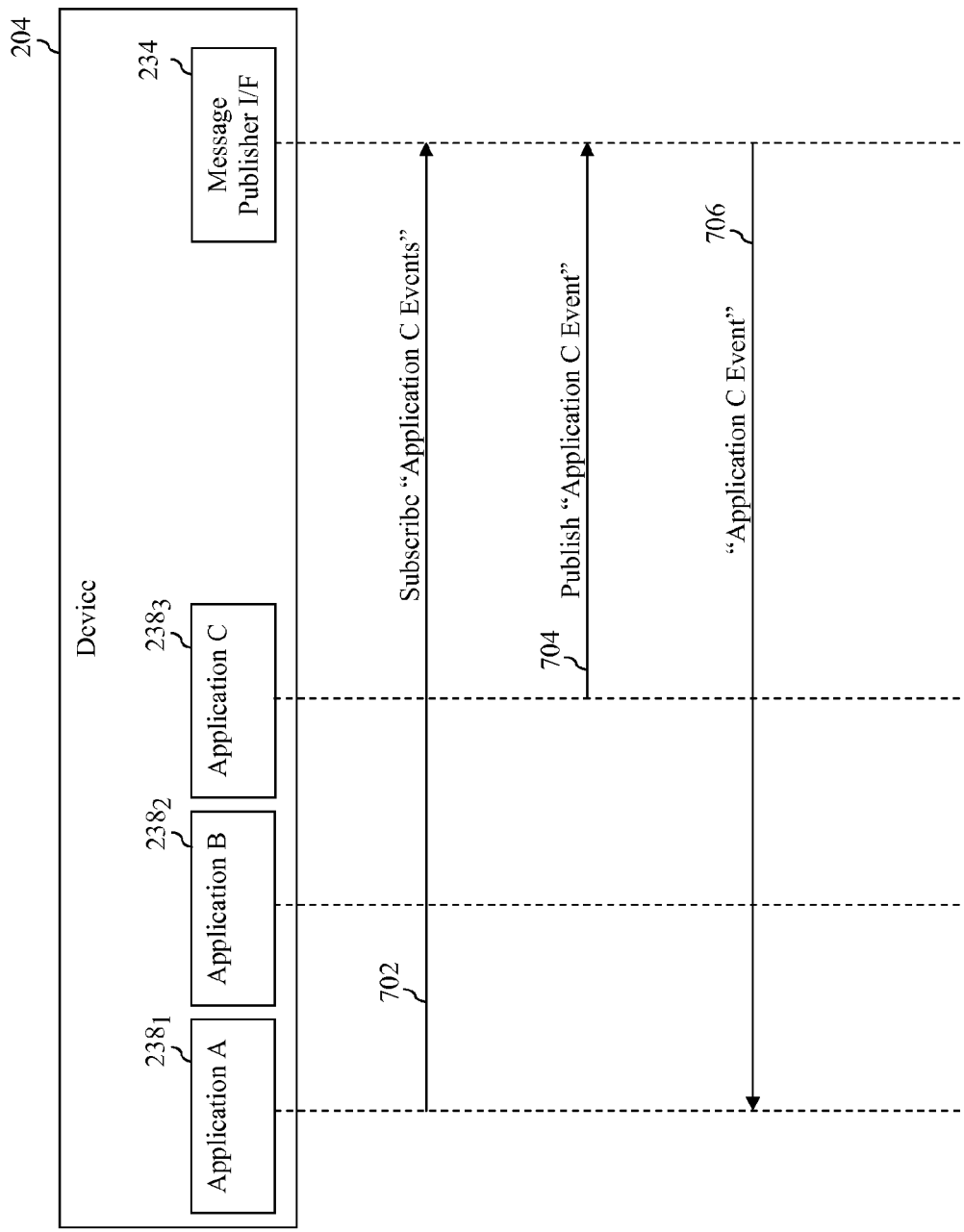
FIG. 7 depicts a sequence diagram that illustrates how a message publisher interface can be used to facilitate communication between two applications installed on the same device in accordance with an embodiment of the invention.

FIG. 7 depicts a sequence diagram 700 that illustrates one example of how such inter-application communication may occur. As shown in FIG. 7, first application $238_1$ (also denoted "Application A") sends a message 702 to message publisher interface 234 to subscribe to events occurring with respect to third application $238_3$ (also denoted "Application C"). In the context of this example, an event may comprise any occurrence or phenomenon that may be detected by third application $238_3$ or about which third application $238_3$ may be notified. In response to receiving this message, message publisher interface 234 registers first application $238_1$ as a subscriber to events occurring with respect to third application $238_3$. As further shown in FIG. 7, after this subscription step, third application $283_3$ sends a message 704 to message publisher interface 234 indicating that an event has occurred. In response to receiving message 704, message publisher interface 234 sends a message 706 to first application $238_1$ to notify first application $238_1$ that the event has occurred, as first application $238_1$ is a registered subscriber or "listener" for events occurring with respect to third application $238_3$.

E. Example Intermediary DMS Client Device

Figure 8:
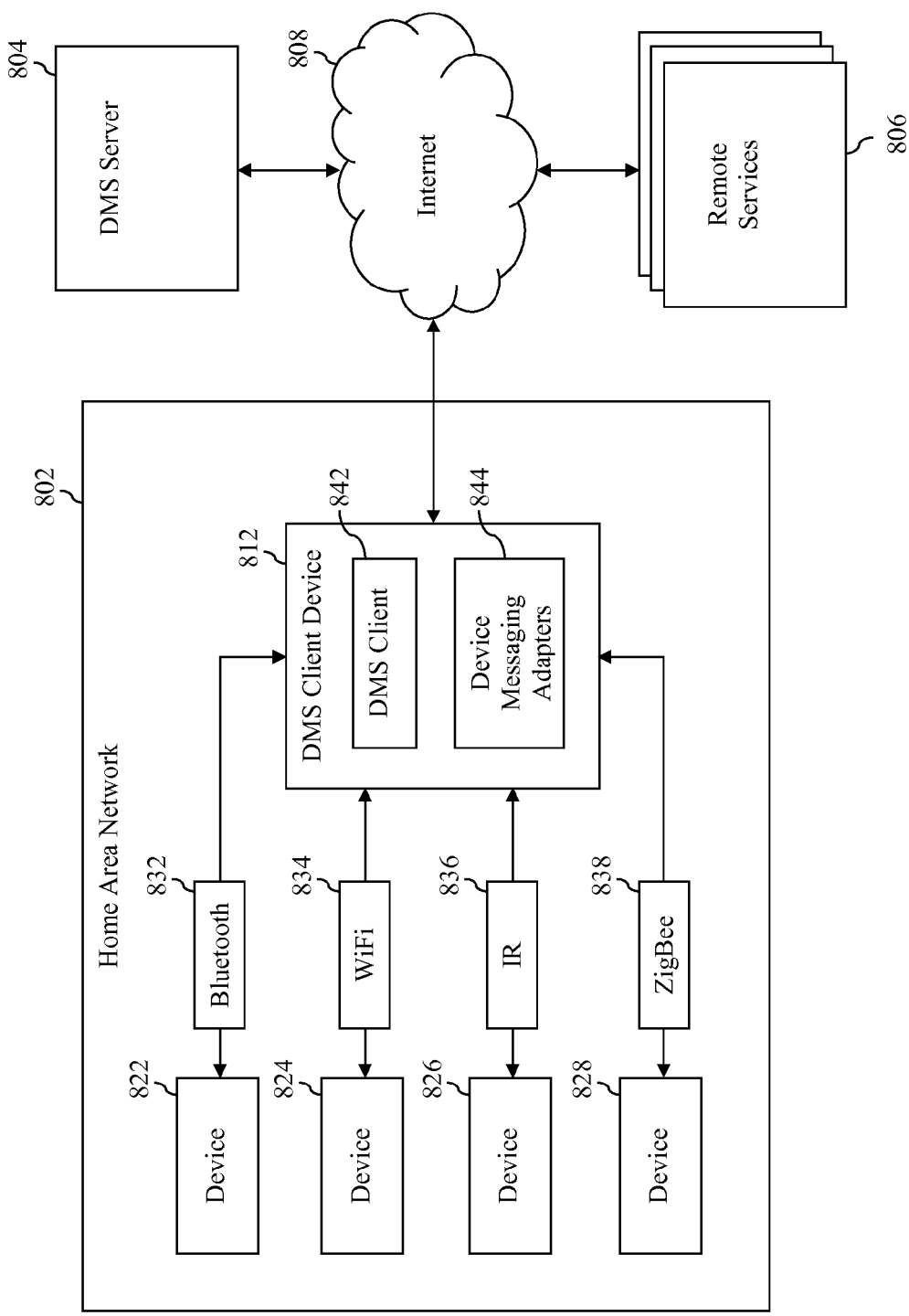
FIG. 8 is a block diagram of a system in accordance with an embodiment of the present invention that enables devices that are incapable of communicating via the Internet to run applications that rely on communication with a remote service to support certain application functionalities or features.

Some devices may not support communication over certain networks. For example, some devices may not be capable of communicating over the Internet. Consequently, such devices may not be able to support applications that have been designed to communicate with a remote service. FIG. 8 is a block diagram of a system 800 in accordance with an embodiment of the present invention that addresses this issue. In particular, system 800 enables devices that are incapable of communicating via the Internet to run applications that rely on communication with a remote service to support certain application functionalities or features.

As shown in FIG. 8, system 800 includes a home area network 802 that is communicatively connected to a DMS server 804 and a plurality of remote services 806 via the Internet 808. As further shown in FIG. 8, home area network 802 comprises a plurality of devices 802, 824, 826 and 828 that are communicatively connected to a DMS client device 812 via a variety of communication mediums. In particular, device 822 is communicatively connected to DMS client device 812 via a Bluetooth® communication medium 832, device 824 is communicatively connected to DMS client device 812 via a WiFi (i.e., an IEEE 802.11) communication medium 834, device 826 is communicatively connected to DMS client device 812 via an infrared (IR) communication medium 836 and device 828 is communicatively connected to DMS client device via a ZigBee communication medium 838.

DMS client device 812 acts as an intermediary between applications installed on each of devices 822, 824, 826 and 828 and one or more remote services. In particular, DMS client device 812 includes a DMS client 842 that sends heartbeat messages to DMS server 804, the heartbeat messages indicating that DMS client 842 is available to receive messages. DMS client 842 also receives application-specific messages that are transmitted from DMS server 804 in response to receiving the heartbeat messages, wherein the application-specific messages are generated by corresponding ones of remote services 806 for processing by a corresponding application installed on one of devices 822, 824, 826 and 828. Various techniques were described above by which remote services 806 can generate such application-specific messages and transmit them to DMS server 804 for queuing pending transmission to DMS client device 812.

DMS client device 812 further includes a number of device messaging adapters 844 that are used to transmit each of the application-specific messages received from DMS server 804 to the appropriate device 822, 824, 826 or 828 upon which is installed the application for which the application-specific message is intended. Different adapters may be used to communicate with different devices and/or over different communication mediums.

It is possible that certain ones of devices 822, 824, 826 or 828 is not capable of communicating over the Internet. However, by acting as an intermediary between applications installed on each of devices 822, 824, 826 and 828 and one or more remote services, DMS client device 812 enables such devices to nevertheless run applications that rely on communication with a remote service to support certain application functionalities or features.

Figure 9:
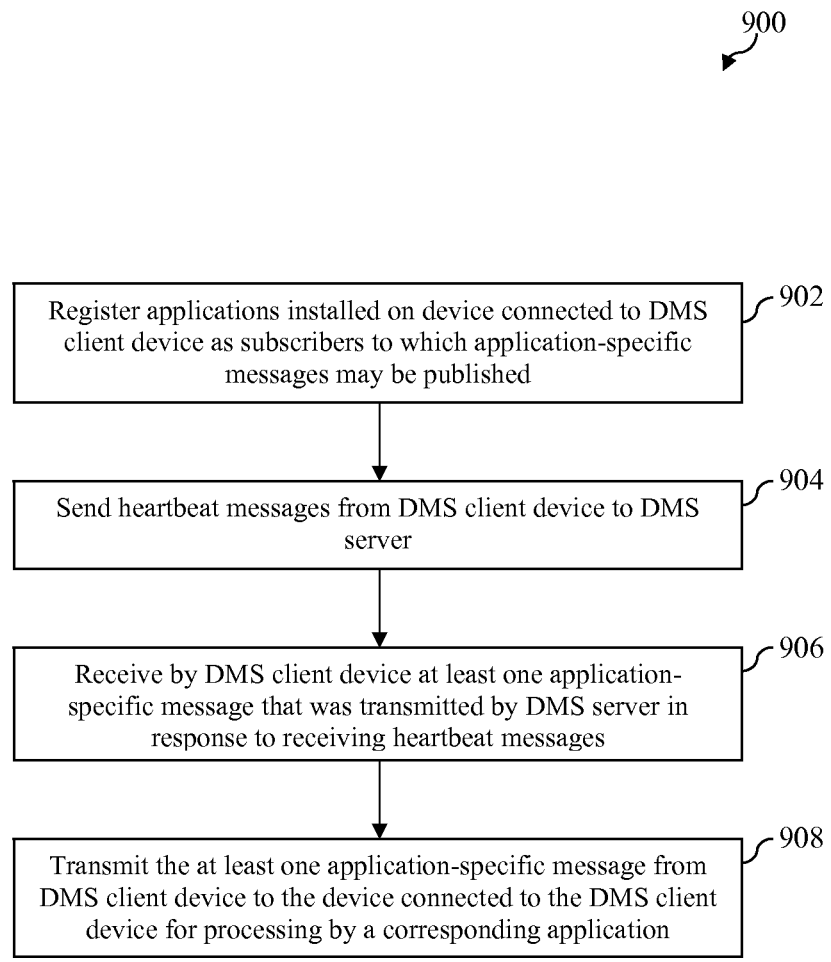
FIG. 9 depicts a flowchart of a method for facilitating communication between remote services and applications installed on a non-IP-capable device in accordance with an embodiment of the present invention.

FIG. 9 depicts a flowchart 900 of a method for facilitating communication between remote services and applications installed on a non-IP-capable device in accordance with an embodiment of the present invention. The method of flowchart 900 will now be described with continued reference to the example system components described above in reference to FIG. 8. However, the method is not limited to that implementation. Persons skilled in the relevant art(s) will appreciate that the steps of flowchart 900 may be implemented by other components or systems entirely.

As shown in FIG. 9, the method of flowchart 900 begins at step 902 in which a DMS client executing on a DMS client device registers applications installed on a device connected to the DMS client device as subscribers to which application-specific messages may be published. This step may be performed, for example, by DMS client 842 which may register applications installed on any of devices 822, 824, 826 and 828 as subscribers to which application-specific messages may be published.

At step 904, the DMS client sends heartbeat messages to a DMS server. The heartbeat messages indicate that the DMS client is available to receive messages. This step may be performed, for example, by DMS client 842 which may send heartbeat messages to DMS server 804 via Internet 808, the heartbeat messages indicating that DMS client 842 is available to receive messages.

At step 906, the DMS client receives at least one application-specific message that was transmitted by the DMS server in response to receiving the heartbeat messages. The at least one application-specific message is generated by a corresponding remote service for processing by a corresponding application installed on a device connected to the DMS client device. This step may be performed, for example, by DMS client 824 which may receive at least one application-specific message that was transmitted by DMS server 804 in response to receiving the heartbeat messages, wherein the at least one-application specific message is generated by a corresponding one of remote services 806 for processing by a corresponding application installed on one of devices 822, 824, 826 or 828.

At step 908, the at least one application-specific message is transmitted from the DMS client device to the device connected thereto for processing by a corresponding application. This step may be performed, for example, by one of device messaging adapters 844, which transmits the at least one application-specific message from DMS client device 812 to one of devices 822, 824, 826 or 828 for processing by a corresponding application installed thereon.

In accordance with the foregoing, DMS client device 812 can act as a proxy for other devices, allowing such other devices to leverage a shared heartbeat service provided by DMS client device 812. This device proxy feature potentially allows for a robust n-tier deployment strategy wherein a single device may serve as a proxy to any number of subordinate devices which in turn may proxy for other devices forming a hierarchical relationship independent of the availability or visibility of the public Internet or dependency on any specific network protocol.

This shared heartbeat proxy technology can enable devices connected to a LAN which does not connect to a WAN to maintain communication paths with a DMS server. Further, a proxy device may be dual-homed to, for instance, address a requirement to couple a utility's private wireless LAN to a LAN connected to a WAN.

Similarly, the shared heartbeat proxy technology provides the unique capability of bridging between communication technologies by enabling a proxy device (e.g., DMS client device 812) to have ingress and egress communication paths of varying protocols such as Bluetooth®, WiFi, IR, Z-Wave or ZigBee network infrastructures.

F. Example Computer System Implementation

Each of the devices and servers shown in FIGS. 1-4, 7 and 8, as well as any of the sub-systems or components contained therein may be implemented in hardware, software, firmware, or any combination thereof. For example, each of the devices and servers shown in FIGS. 1-4, 7 and 8, as well as any of the sub-systems or components contained therein may be implemented as computer program code configured to be executed in one or more processors. Alternatively, each of the devices and servers shown in FIGS. 1-4, 7 and 8, as well as any of the sub-systems or components contained therein as hardware logic/electrical circuitry.

Figure 10:
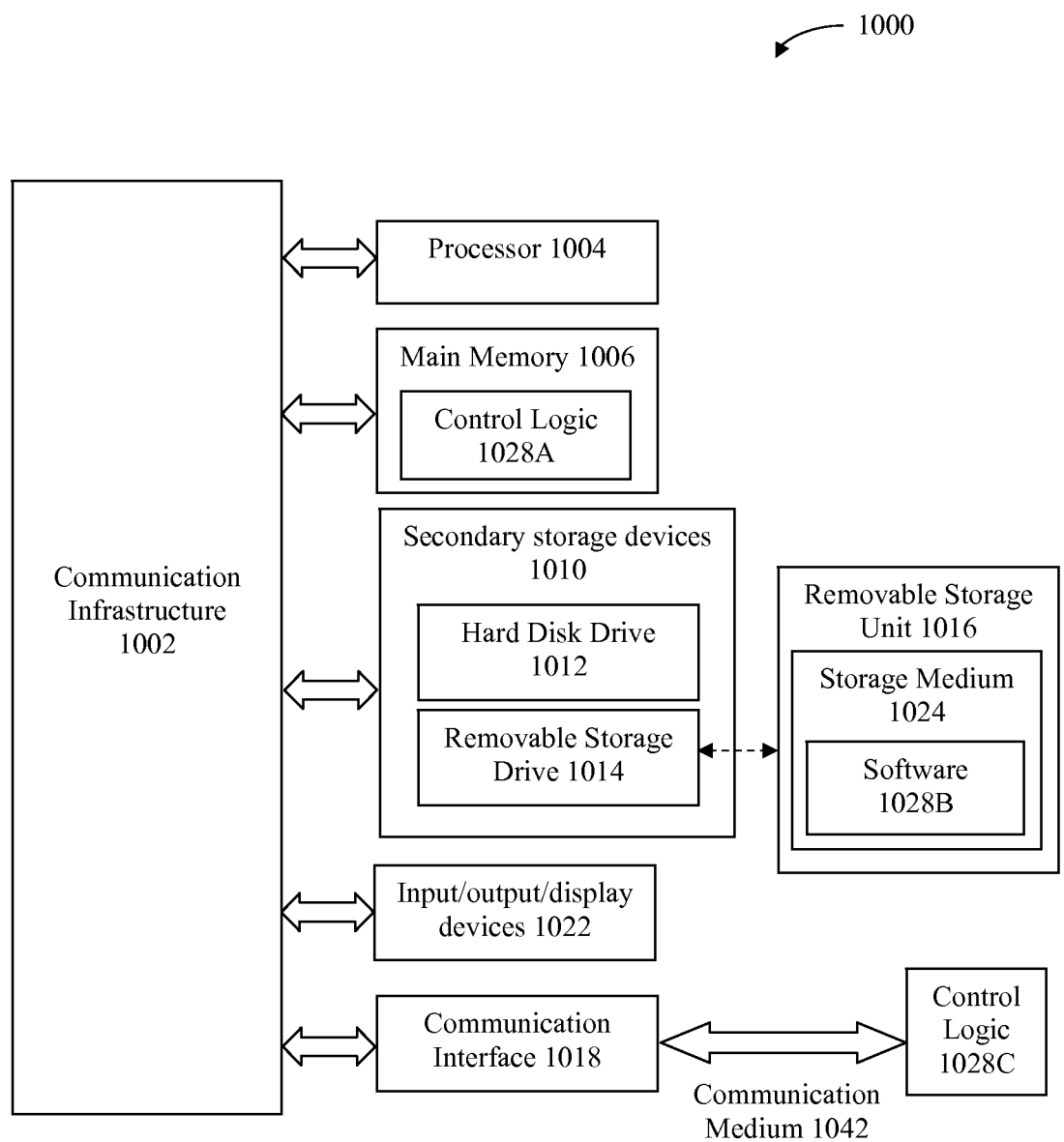
FIG. 10 is a block diagram of a computer system that may be used to implement one or more aspects of the present invention.

The embodiments described herein, including systems, methods/processes, and/or apparatuses, may be implemented using well known servers/computers, such as a computer 1000 shown in FIG. 10. For example, each of the devices and servers shown in FIGS. 1-4, 7 and 8, as well as any of the sub-systems or components contained therein may be implemented using one or more computers 1000.

Computer 1000 can be any commercially available and well known computer capable of performing the functions described herein, such as computers available from International Business Machines, Apple, Sun, HP, Dell, Cray, etc. Computer 1000 may be any type of computer, including a desktop computer, a server, etc.

Computer 1000 includes one or more processors (also called central processing units, or CPUs), such as a processor 1004. Processor 1004 is connected to a communication infrastructure 1002, such as a communication bus. In some embodiments, processor 1004 can simultaneously operate multiple computing threads.

Computer 1000 also includes a primary or main memory 1006, such as random access memory (RAM). Main memory 1006 has stored therein control logic 1028A (computer software), and data.

Computer 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, computer 1000 may include an industry standard interface, such a universal serial bus (USB) interface for interfacing with devices such as a memory stick. Removable storage drive 1000 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1024 having stored therein computer software 1028B (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well known manner.

Computer 1000 also includes input/output/display devices 1022, such as monitors, keyboards, pointing devices, etc.

Computer 1000 further includes a communication or network interface 1018. Communication interface 1018 enables computer 1000 to communicate with remote devices. For example, communication interface 1018 allows computer 1000 to communicate over communication networks or mediums 1042 (representing a form of a computer useable or readable medium), such as LANs, WANs, the Internet, etc. Communication interface 1018 may interface with remote sites or networks via wired or wireless connections.

Control logic 1028C may be transmitted to and from computer 1000 via the communication medium 1042.

Any apparatus or manufacture comprising a computer useable or readable medium having control logic (software) stored therein is referred to herein as a computer program product or program storage device. This includes, but is not limited to, computer 1000, main memory 1006, secondary storage devices 1010, and removable storage unit 1016. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for implementing the features of each of the devices and servers shown in FIGS. 1-4, 7 and 8, as well as any of the sub-systems or components contained therein, any of the methods or steps of the flowcharts of FIGS. 5, 6 and 9, and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

G. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for facilitating communication between remote services and applications installed on a device, comprising:

receiving shared heartbeat messages sent from a device management system (DMS) client executing on the device to a DMS server, the shared heartbeat messages indicating that the DMS client is available to receive messages;

transmitting a plurality of application-specific messages from the DMS server to the DMS client in response to receiving the shared heartbeat messages, each application-specific message being generated by a corresponding remote service for processing by a corresponding application installed on the device receiving the application-specific messages from the corresponding remote services at the DMS server; and storing the application-specific messages in a queue at the DMS server prior to transmission to the DMS client;

wherein inter-application communication between the applications installed on the device is arranged by a message subscriber interface of the device such that the applications are able to share information with each other;

wherein as part of the arrangement of the inter-application communication arranged by the message subscriber interface, a first application of the installed applications sends a message to the message subscriber interface to subscribe to events occurring with respect to a second application of the installed applications.

2. The method of claim 1, wherein receiving the application-specific messages from the corresponding remote services at the DMS server comprises:

receiving the application-specific messages from the remote services via a message publication application programming interface (API) of the DMS server.

3. The method of claim 1, further comprising:

monitoring by the DMS server a time-to-live value associated with a particular application-specific message stored in the queue; and removing by the DMS server the particular application-specific message from the queue if the time-to-live value associated therewith has expired.

4. The method of claim 1, wherein transmitting the plurality of application-specific messages from the DMS server to the DMS client comprises:

transmitting, in association with each application-specific message, an identification of an application-specific channel to which the application-specific message is to be published upon receipt by the DMS client.

5. The method of claim 1, wherein receiving the shared heartbeat messages and transmitting the plurality of application-specific messages comprises:

receiving the shared heartbeat messages and transmitting the plurality of application-specific messages over a common transport channel established between the DMS client and the DMS server.

6. A method for facilitating communication between remote services and applications installed on a device, comprising:

sending shared heartbeat messages from a device management system (DMS) client executing on the device to a DMS server, the shared heartbeat messages indicating that the DMS client is available to receive messages; and receiving by the DMS client a plurality of application-specific messages that were transmitted by the DMS server in response to receiving the shared heartbeat messages, each application-specific message being generated by a corresponding remote service for processing by a corresponding application installed on the device;

wherein the applications installed on the device are able to share information with each other by inter-application communication arranged by a message subscriber interface of the device;

wherein as part of the inter-application communication, sending a message from a first application of the installed applications to the message subscriber interface for subscribing the first application to events occurring with respect to a second application of the installed applications.

7. The method of claim 6, further comprising:
publishing the application-specific messages by the DMS client to corresponding applications installed on the device via the message subscriber interface.

8. The method of claim 7, further comprising:
registering the corresponding applications by the DMS client as subscribers to which application-specific messages may be published in response to receiving subscription requests from the corresponding applications via the message subscriber interface of the device.

9. The method of claim 8, wherein registering the corresponding applications comprises establishing an application-specific channel in association with each of the corresponding applications; and
wherein publishing the application-specific messages to the corresponding applications comprises publishing each of the application-specific messages to a corresponding application-specific channel.

10. The method of claim 6, wherein sending the shared heartbeat message and receiving the plurality of application-specific messages comprises:
sending the shared heartbeat message and receiving the plurality of application-specific messages via a common transport channel established between the DMS client and the DMS server.

11. A device management services (DMS) server, comprising:
a message publisher interface that receives a plurality of application-specific messages, each of the application-specific messages being generated by a corresponding remote service for processing by a corresponding application installed on a device;
DMS server logic that receives shared heartbeat messages sent from a DMS client executing on the device and that transmits the plurality of application-specific messages to the DMS client in response to the receipt of the shared heartbeat messages; and
a queue;
wherein the DMS server logic stores the plurality of application-specific messages in the queue prior to transmission to the DMS client;
wherein the message publisher interface communicates with a message subscriber interface of the device and the message subscriber interface enables inter-application communication such that a plurality of applications installed on a device supported by the DMS server are able to share information with each other;
wherein as part of inter-application communication, a first application of the device sends a message to the message subscriber interface of the device to subscribe to events occurring with respect to a second application of the device.

12. The DMS server of claim 11, wherein the message publisher interface comprises a remote services application programming interface (API).

13. The DMS server of claim 11, wherein the DMS server logic monitors a time-to-live value associated with a particular application-specific message stored in the queue and removes the particular application-specific message from the queue if the time-to-live value associated therewith has expired.

14. The DMS server of claim 11, wherein the DMS server logic transmits the plurality of application-specific messages to the DMS client by transmitting, in association with each application-specific message, an identification of an application-specific channel to which the application-specific message is to be published upon receipt by the DMS client.

15. The DMS server of claim 11, wherein the DMS server logic receives the shared heartbeat messages from the DMS client and transmits the plurality of application-specific messages to the DMS client over a common transport channel established between the DMS client and the DMS server.

16. A device with applications installed thereon, comprising:
a device management system (DMS) client that sends shared heartbeat messages to a DMS server, the shared heartbeat messages indicating that the DMS client is available to receive messages, and that receives a plurality of application-specific messages that were transmitted by the DMS server in response to receiving the shared heartbeat messages, each application-specific message being generated by a corresponding remote service for processing by a corresponding application installed on the device; and
a message subscriber interface by which the DMS client publishes the application-specific messages to the corresponding applications installed on the device;
wherein the message subscriber interface is configured to arrange inter-application communication such that the applications installed on the device are able to share information with each other;
wherein the message subscriber interface is further configured to receive a message from a first application of the installed applications to subscribe to events occurring with respect to a second application of the installed applications as part of the inter-application communication.

17. The device of claim 16, wherein the DMS client registers the corresponding applications as subscribers to which application-specific messages may be published in response to receiving subscription requests from the corresponding applications via the message subscriber interface.

18. The device of claim 16, wherein the DMS client registers the corresponding applications by establishing an application-specific channel in association with each of the corresponding applications and publishes the application-specific messages to the corresponding applications by publishing each of the application-specific messages to a corresponding application-specific channel.

19. The device of claim 16, wherein the DMS client sends the shared heartbeat messages and receives the plurality of application-specific messages via a common transport channel established between the DMS client and the DMS server.

20. A device management system (DMS) client device, comprising:
a device management system (DMS) client that sends shared heartbeat messages to a DMS server, the shared heartbeat messages indicating that the DMS client is available to receive messages, and that receives at least one application-specific message that was transmitted by the DMS server in response to receiving the shared heartbeat messages, the at least one application-specific message being generated by a corresponding remote service for processing by a corresponding application installed on a device connected to the DMS client device; and
a device messaging adapter that transmits the at least one application-specific message from the DMS client device to the device connected thereto;
wherein the DMS client device includes a message subscriber interface that is configured to arrange inter-application communication such that applications on the device are able to share information with each other;

wherein as part of the inter-application communication, the message subscriber interface is further configured to receive a message from a first application of the device to subscribe to events occurring with respect to a second application of the device.

\* \* \* \* \*

UNITED STATES PATENT AND TRADEMARK OFFICE
CERTIFICATE OF CORRECTION

PATENT NO.        : 8,756,311 B2
APPLICATION NO.   : 13/116834
DATED             : June 17, 2014
INVENTOR(S)       : Robert M. Dare et al.

Page 1 of 1

It is certified that error appears in the above-identified patent and that said Letters Patent is hereby corrected as shown below:

In the Claims

Column 16, Line 9, Insert -- ; -- between the words "device" and "receiving" such that the line should read "application installed on the device; receiving the application"

Signed and Sealed this
Seventh Day of April, 2015

Michelle K. Lee
*Director of the United States Patent and Trademark Office*